United States Patent
Brutel et al.

(10) Patent No.: US 7,471,728 B2
(45) Date of Patent: Dec. 30, 2008

(54) MULTICARRIER SIGNAL, METHOD OF TRACKING A TRANSMISSION CHANNEL BASED ON SUCH A SIGNAL AND DEVICE THEREFOR

(75) Inventors: Christophe Brutel, Paris (FR); Philippe Mege, Bourg-la-Reine (FR)

(73) Assignee: EADS Telecom, Montigy-le-Brestonneux (FR)

( * ) Notice: Subject to any disclaimer, the term of this patent is extended or adjusted under 35 U.S.C. 154(b) by 478 days.

(21) Appl. No.: 10/489,532

(22) PCT Filed: Aug. 9, 2002

(86) PCT No.: PCT/FR02/02845

§ 371 (c)(1),
(2), (4) Date: Mar. 12, 2004

(87) PCT Pub. No.: WO03/024041

PCT Pub. Date: Mar. 20, 2003

(65) Prior Publication Data

US 2004/0240572 A1 Dec. 2, 2004

(30) Foreign Application Priority Data

Sep. 12, 2001 (FR) .................................. 01 11817

(51) Int. Cl.
*H04L 27/28* (2006.01)
(52) U.S. Cl. ...................... 375/260; 370/491
(58) Field of Classification Search ................. 375/239, 375/222, 368, 279, 260; 370/208, 210, 343, 370/345, 478, 480, 491, 498, 500
See application file for complete search history.

(56) References Cited

U.S. PATENT DOCUMENTS

| | | | |
|---|---|---|---|
| 5,274,629 A | 12/1993 | Helard et al. | 370/50 |
| 5,572,548 A | 11/1996 | Pirez et al. | 375/260 |
| 5,771,224 A | 6/1998 | Seki et al. | 370/206 |
| 5,867,478 A * | 2/1999 | Baum et al. | 370/208 |
| 5,896,419 A * | 4/1999 | Suzuki | 375/219 |
| 6,278,686 B1 * | 8/2001 | Alard | 370/204 |
| 7,092,436 B2 * | 8/2006 | Ma et al. | 375/229 |
| 7,230,911 B2 * | 6/2007 | Jacobsen | 370/208 |
| 2002/0191630 A1 * | 12/2002 | Jacobsen | 370/503 |
| 2003/0215021 A1 * | 11/2003 | Simmonds | 375/260 |

FOREIGN PATENT DOCUMENTS

| | | |
|---|---|---|
| EP | 0 441 731 A1 | 8/1991 |
| EP | 0 549 445 A1 | 6/1993 |
| EP | 0 734 132 A2 | 9/1996 |

OTHER PUBLICATIONS

ISR of PCT/FR02/02845 issued Dec. 12, 2002—EPO Rijswijk.
Fernandez-Getino Garcia, et al., "Efficient pilot patterns for channel estimation in OFDM systems over HF channels". IEEE vehicular technology conference Sep. 1999 pp. 2193-2197.

(Continued)

*Primary Examiner*—Betsy L Deppe
(74) *Attorney, Agent, or Firm*—McCracken & Frank LLP

(57) ABSTRACT

The invention provides a multicarrier system constructed on a time-frequency lattice defined comprising frames having MxN symbols distributed over M subcarriers each of which is divided into N specific symbol times. Each frame comprises P pilot symbols distributed time-wise and frequency-wise so as to cover the frame in a meshed structure, so that, in particular, some at least of the M subcarriers contain no pilot symbol and/or that no pilot symbol should be transmitted to some at least of the N symbol times. The invention also relates to a method for tracking a transmission channel using such a signal, and a device for implementing the method.

11 Claims, 6 Drawing Sheets

OTHER PUBLICATIONS

Tufvesson, Maseng: "Pilot assisted estimation for OFDM in mobile cellular systems" IEEE vehicular technology conference May 1997 pp. 1639-1643.

Vook, Baum : "Adaptative antennas for OFDM" IEEE vehicular technology conference May 1998 pp. 606-610.

Munster et al.:"Co-channel interference suppression assisted adaptative OFDM in interference limited environments" IEEE vehicular technology conference Sep. 1999, pp. 284-288.

Chien-Min Kao et al.:"An interpolation method using signal recovery and discrete Fourier transform" Nuclear Science Symposium Nov. 1998 pp. 1387-1391.

Le Floch et al.:"Coded orthogonal frequency division multiplex" proceedings of the IEEE vol. 83 No. 6, Jun. 1995.

William C. Jakes, Jr. "Microwave Mobile Communications" Wiley & Sons. 1974, pp. 19-25.

* cited by examiner

MULTICARRIER SIGNAL, METHOD OF TRACKING A TRANSMISSION CHANNEL BASED ON SUCH A SIGNAL AND DEVICE THEREFOR

BACKGROUND OF THE INVENTION

1. Technical Field

The present invention relates to a multicarrier signal, a method of tracking a transmission channel on the basis of such a signal and a device therefor.

It concerns the field of digital transmissions (digital radio transmissions), and finds applications in particular in receivers of systems for digital radiocommunications with mobiles, for example professional radiocommunications systems (PMR systems, the abbreviation standing for "Professional Mobile Radio").

2. Related Art

In these systems, the digital data are transmitted by modulation of a radiofrequency carrier wave. Stated otherwise, a radio signal is sent over the transmission channel, this signal being modulated so as to carry the digital information to be transmitted.

One seeks to implement modulation techniques that offer better resistance with regard to disturbances undergone by the radio signal during its transmission through the transmission channel. In essence, these disturbances originate:

- on the one hand from the fading phenomenon, which is frequency selective as soon as the coherence band is overstepped (one speaks in this first case of selective fading), but which is not frequency selective once the width of the channel is less than the coherence band (one speaks in this latter case of flat fading). This fading phenomenon is due to the propagation multipaths which give rise to intersymbol interference (ISI) also known as intersymbol distortion. Selective fading is the image in the frequency domain of propagation multipaths exhibiting large delays between paths (the maximum delay between the paths is such that the inverse of this delay is less than the width of the band of the signal). Flat fading occurs when the delay between the propagation multipaths is small and when the maximum delay between the paths is such that the inverse of this delay is greater than the width of the band of the signal.
- on the other hand, the amplitude and the phase of the or of each of the propagation paths may be static (in the sense that they do not vary in the course of time) or on the contrary dynamic (when the propagation conditions vary in the course of time). In the dynamic case, the frequency of this phenomenon (also called the frequency of the fading) and, more generally, the frequency spectrum of the fading are related to the speed of the mobile and to the carrier frequency of the signal sent. The conventional model adopted for the power spectrum of the fading is described in the work "Microwave Mobile Communications", by William C. Jakes, Jr., published by John Wiley & Sons, 1974, pp. 19-25), and involves the Doppler frequency $f_D$ given by:

$$f_D = \frac{V}{c} \times f_c$$

where V is the speed of the mobile, c is the speed of light, and $f_c$ the frequency of the carrier.

The power spectral density of the fading is therefore:

$$p_{fading}(f) = \frac{p}{\pi} \times \frac{1}{f_D} \times \frac{1}{\sqrt{(1-(f/f_D)^2)}}$$

with $P_{fading}(f)$ the power of the fading, that is to say the power of the signal received.

There is currently effort to seek to implement a multicarrier modulation called OFDM (standing for "Orthogonal Frequency Multiplexing"). This modulation technique has been adopted for the European standard regarding digital audio broadcasting systems (DAB systems, the abbreviation standing for "Digital Audio Broadcasting"). It consists in distributing the data to be transmitted over a set of subcarriers sent in parallel in the radio signal. This results in a flat fading effect in relation to each subcarrier since the bandwidth of each subcarrier is less than the coherence band. Furthermore, it results in a reduction in the sensitivity of transmission in relation to the phenomenon of multipaths.

Nevertheless, the OFDM technique has certain constraints in the applications of the type of those envisaged above, in which the spectral efficiency of the transmission is a key characteristic.

Specifically, the signal to be transmitted is constructed on a time-frequency lattice. The signal is structured framewise, frames being transmitted successively through the transmission channel. Each frame comprises a number M of adjacent subcarriers within a channel of specific spectral width, each of these subcarriers being divided into N time intervals, called symbol times. The duration of a symbol time corresponds to the duration of transmission of a symbol. A frame of the signal therefore comprises M×N symbols. It is recalled that a symbol corresponds to a specific number of information bits, for example eight bits, which takes a specific value in an ad hoc alphabet.

However, it is necessary to introduce pilot symbols into the frame so as to allow the tracking of the transmission channel by the receiver. It is recalled that a pilot symbol is a symbol introduced into the frame by the sender, at a location and with a value which are known to the receiver. Channel tracking is carried out by a sequence of steps implemented by the receiver before the actual demodulation of the signal received. This sequence of steps comprises, on the one hand, the estimation of the value of the channel (that is to say the value of the amplitude and of the phase of the channel) for the pilot symbols of the frame, which produces values of the channel that are estimated for all the pilot symbols of the frame. It further comprises an interpolation of the value of the channel for the other symbols of the frame, which produces M×N values of the channel that are interpolated for all the symbols of the frame. According to a customary interpolation process, the values of the channel that are interpolated for the pilot symbols of the frame correspond to the values of the channel that are estimated for these symbols (stated otherwise, the interpolation step conserves, for the pilot symbols, the values produced by the estimation step).

The tracking of the channel is aimed at estimating the disturbances undergone by the symbols during the transmission of the frame through the transmission channel, which result in particular from the aforesaid two phenomena. One thus generates a matrix of interpolated values, which is an M×N matrix, which is used for the actual demodulation of the frame received.

The presence of the pilot symbols in the frame generates an overhead, which penalizes the useful throughput of the transmission (generally expressed as a number of symbols per second).

In the state of the art, the tracking of the channel is carried out subcarrier by subcarrier. For this purpose, each subcarrier contains pilot symbols, and a temporal interpolation is performed for each subcarrier on the basis of the values of the channel that are estimated from the pilot symbols that it contains.

SUMMARY OF THE INVENTION

The invention thus proposes a multicarrier signal constructed on a time-frequency lattice defined by a frequency axis and a time axis, the signal comprising frames having M×N symbols distributed over M subcarriers each of which is divided into N specific symbol times. Each frame comprises P pilot symbols distributed timewise and frequencywise in such a way as to cover the frame according to a meshed structure defined by a first and a second specific directions corresponding to noncolinear vectors, where the numbers M, N and P are nonzero integers, so that on the one hand the projection onto the frequency axis of the maximum spacing between two pilot symbols or blocks of pilot symbols adjacent in both said first direction and said second direction is less than half the inverse of the maximum delay between the multipaths through the propagation channel, and that, on the other hand, the projection onto the time axis of the maximum spacing between two pilot symbols or blocks of pilot symbols adjacent in both said first direction and said second direction is less than half the inverse of the fading frequency through the transmission channel, and so that, furthermore, certain at least of the M subcarriers contain no pilot symbol and/or that no pilot symbol is transmitted at certain at least of the N symbol times. Furthermore, the frame comprises blocks of pilot symbols, a block of pilot symbols being a group of pilot symbols for which a time stationarity condition and a frequency stationarity condition of the transmission channel is satisfied.

The fact that certain at least of the M subcarriers contain no pilot symbol and/or the fact that no pilot symbol is transmitted at certain at least of the N symbol times, make it possible in certain cases (that is to say with certain structures of frames and under certain assumptions relating to the propagation through the transmission channel which are taken into account) to reduce the overhead of the transmission.

The blocks of pilot symbols allow improved estimation of the values of the transmission channel, which exploits the diversity of the pilot symbols contained in each block.

The invention also proposes a method of tracking a transmission channel on the basis of a multicarrier signal as defined above, comprising the following steps:

a) estimation of the channel on the basis of the pilot symbols, in such a way as to produce values of the channel that are estimated for at least certain of the symbols of the frame which correspond to pilot symbols;

b) first interpolations, on the basis of said estimated values, according to all the directions parallel to said first specific direction and passing through at least two different pilot symbols for which there exists an estimated value of the channel, in such a way as to produce first interpolated values of the channel for the symbols of the frame in all these directions;

c) second interpolations, on the basis of said first interpolated values, in all the directions parallel to said second specific direction and passing through at least two symbols for which there exists a first interpolated value, in such a way as to produce second interpolated values of the channel for substantially the entirety of the symbols of the frame;

d) as the case may be, assignment to each frame symbol for which there exists no second interpolated value of the channel, respectively of the interpolated value of the channel for the frame symbol which is the closest thereto and for which there exists a second interpolated value of the channel.

The step of estimating the channel is carried out by joint estimation on the basis of the pilot symbols of blocks of pilot symbols, a block of pilot symbols being a group of pilot symbols for which a time stationarity condition and a frequency stationarity condition of the transmission channel is satisfied.

Such a method makes it possible to reconstruct the set of symbols of the frame, despite the fact that certain at least of the M subcarriers contain no pilot symbol and/or that no pilot symbol is transmitted to certain at least of the N symbol times. The blocks of pilot symbols allow improved estimation of the values of the transmission channel, for the reasons given above.

The invention further relates to a device comprising means for the implementation of the method. The device comprises:

means of estimating the channel on the basis of the pilot symbols, making it possible to produce channel values estimated for at least certain of the symbols of the frame which correspond to pilot symbols;

first means of interpolation, for forming first interpolations, on the basis of said estimated values, according to all the directions parallel to said first specific direction and passing through at least two different pilot symbols for which there exists an estimated value of the channel, in such a way as to produce first interpolated values of the channel for the symbols of the frame in all these directions;

second means of interpolation, for performing second interpolations, on the basis of said first interpolated values, in all the directions parallel to said second specific direction and passing through at least two symbols for which there exists a first interpolated value, in such a way as to produce second interpolated values of the channel for substantially the entirety of the symbols of the frame.

When necessary, that is to say when the structure of the frame is such that there exist in the frame symbols for which there exists no second interpolated value of the channel (in particular the symbols at the frame limit), the device furthermore comprises means of assignment, for assigning to each frame symbol for which there exists no second interpolated value of the channel, the interpolated value of the channel for the frame symbol which is closest thereto and for which there exists a second interpolated value of the channel.

BRIEF DESCRIPTION OF THE DRAWINGS

Nevertheless, according to an advantageous characteristic of the invention, it is noted that in all cases there exist subcarriers on which no pilot symbol is sent. This makes it possible, in certain frame structures, to reduce the overhead of the transmission.

FIGS. 4a to 4c are arrays corresponding to a matrix of values of the channel;

Nevertheless, according to an advantageous characteristic of the invention, it is noted that in all cases there exist subcarriers on which no pilot symbol is sent. This makes it possible, in certain frame structures, to reduce the overhead of the transmission.

DESCRIPTION OF PREFERRED EMBODIMENTS

Figure 1:
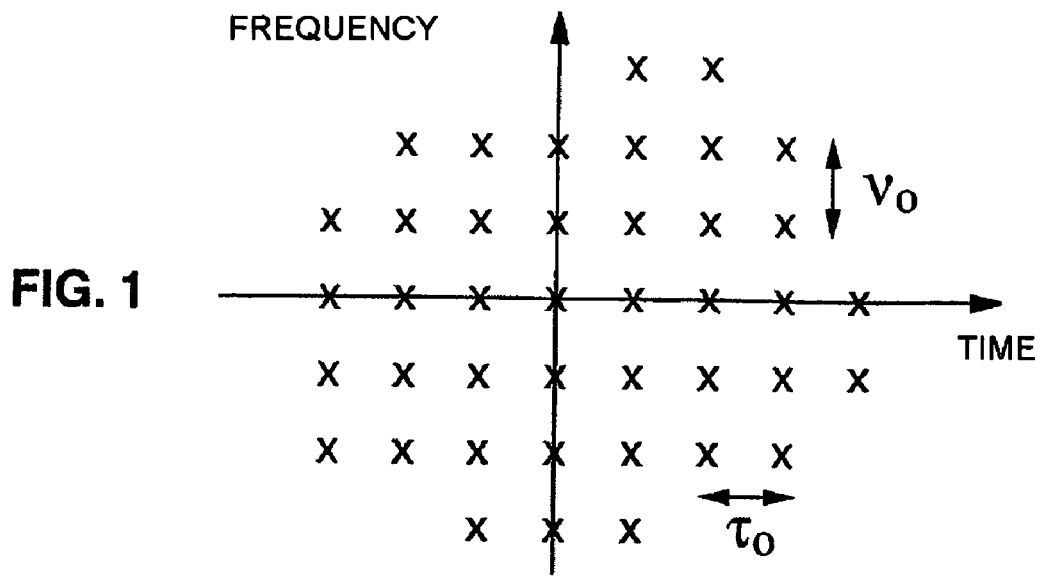
FIG. 1 is a chart illustrating a time-frequency lattice on which the signal transmitted over the transmission channel is constructed.

The chart of FIG. 1 illustrates a time-frequency lattice defined by a frequency axis and by a time axis. The lattice comprises a set of symbols represented symbolically by crosses.

The object of this figure is to introduce a certain number of conventions which are used subsequently. By convention, specifically, the frequency axis is represented vertically and the time axis is represented horizontally. Each symbol is tagged by an index m along the frequency axis, and by an index n along the time axis. In what follows and in the figures, a symbol whose position along the frequency axis is defined by the index m, and whose position along the time axis is defined by the index n is denoted $S_{m,n}$. Finally, the spacing between the symbols along the frequency axis is denoted $\gamma_0$. Likewise, the spacing between the symbols along the time axis is denoted $\tau_0$.

If S(t) denotes a signal constructed on such a lattice of symbols, then the signal S(t) can be decomposed in the form:

$$S(t) = \sum_{m,n} c_{m,n} \times g_{m,n}(t) = \sum_{m,n} c_{m,n} \times e^{2i m \gamma_0 t} \times g(t - n\tau_0) \quad 5$$

where the coefficients $c_{m,n}$ are coefficients corresponding to the value of the symbol $S_{m,n}$, and where the functions $g_{m,n}(t)$ are prototype functions which define a Hilbert space, and where the function g(t) has the property of being invariant under discrete Fourrier transform (DFT) or under inverse Fourrier transform (IDFT).

According to intrinsic properties of the time-frequency lattice, the symbols are orthogonal, thereby allowing simple and efficient demodulation. The lattice is then said to be orthogonal. By definition, the symbols are orthogonal if their scalar product is zero.

This is the case in particular when implementing a modulation of OFDM/QAM type (the abbreviation standing for "OFDM/Quadrature Amplitude Modulation") or OFDM/OQAM type (the abbreviation standing for "OFDM/Offset Quadrature Amplitude Modulation"). The prototype functions then define a Hilbert base of unit dimension, that is to say $\gamma_0 \times \tau_0 = 1$. Advantageously, the coefficients $c_{m,n}$ are then complex coefficients. We can write $c_{m,n} = a_{m,n} + i \times b_{m,n}$, where $a_{m,n}$ and $b_{m,n}$ are real coefficients. This is what offers the possibility of employing amplitude- and phase-modulation.

Nevertheless it is preferable to guarantee a frequency guard band so as to guarantee the timewise and frequencywise orthogonality for the OFDM/QAM. Likewise, it is preferable to guarantee a guard interval between the transmission of two consecutive symbols on each subcarrier, so as to limit the intersymbol distortion in the case of OFDM/OQAM. In the case of OFDM/QAM and of OFDM/OQAM these frequency or time guards penalize the throughput of the transmission (expressed as a number of symbols per second).

When using OFDM/IOTA modulation (the abbreviation standing for "OFDM/Isotropic Orthogonal Transform Algorithm"), the orthogonality between symbols is also ensured. With such modulation, the prototype functions define a hilbert base of dimension 2, that is to say such that $\gamma_0 \times \tau_0 = 2$. The way in which an orthogonal time/frequency lattice is defined with such a modulation is for example described in the article "Coded Orthogonal Frequency Division Multiplex", Bernard LE FLOCH et al., Proceedings of the IEEE, Vol. 83, No. 6, June 1995. The coefficients $c_{m,n}$ are then real or pure imaginary coefficients depending on their placement in the frame. They are always one-dimensional. This only offers the possibility of amplitude modulation. Nevertheless, it is not necessary to guarantee a guard time between the symbols or between the subcarriers, this having the advantage of increasing the throughput of the transmission.

A frame is defined along the frequency axis and along the time axis, respectively by a frequency band B, and by a duration D. It comprises M subcarriers, where M is an integer such that $B = M \times \gamma_0$. Moreover, each subcarrier is divided into N symbol times, where N is an integer such that $D = N \times \tau_0$. The frame therefore comprises M×N symbols.

By convention, a double order relation is defined for tagging the location of a symbol in the frame along the frequency axis on the one hand, and along the time axis on the other hand. According to this order relation, the symbol $S_{1,1}$ is the symbol which is carried on the first subcarrier (that having the index 1) and which is transmitted first on this subcarrier, that is to say which is situated in the first symbol time (that of index 1). This symbol $S_{1,1}$ is conventionally represented at the bottom left in the figures. Likewise, the symbol $S_{M,N}$ is the symbol which is carried on the last subcarrier of the frame (that having the index M) and which is transmitted last on this subcarrier, that is to say which is situated in the last symbol time (that of index N). This symbol $S_{M,N}$ is conventionally represented at the top right in the figures. Generally, the symbol $S_{m,n}$ is the symbol which is carried on the m-th subcarrier of the frame (that having the index m) and which is transmitted on this subcarrier in the n-th symbol time (that of index N).

Figure 2A:
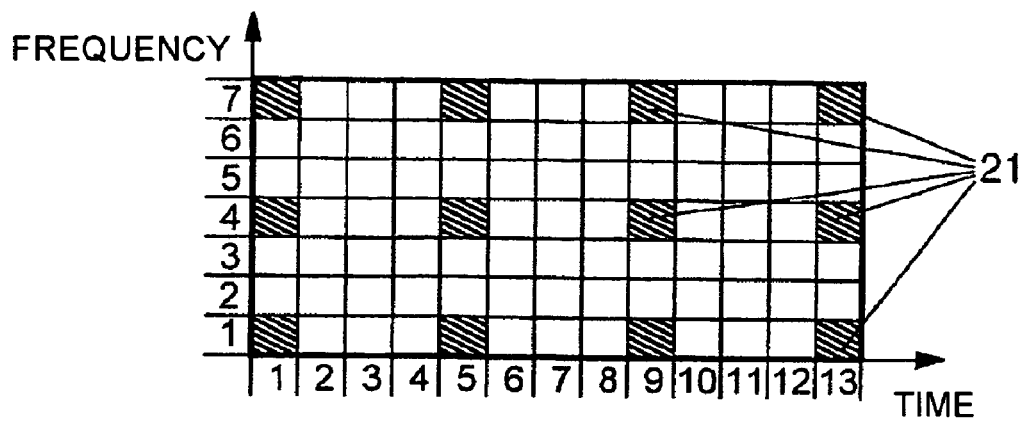
FIGS. 2a to 2d are charts illustrating the structure of a frame of a multicarrier signal according to the invention, according to four different examples.
Figure 2B:
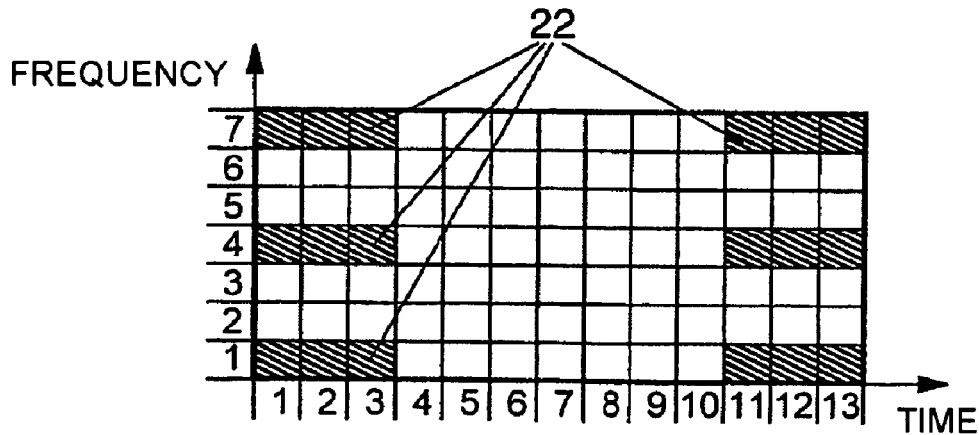
Figure 2C:
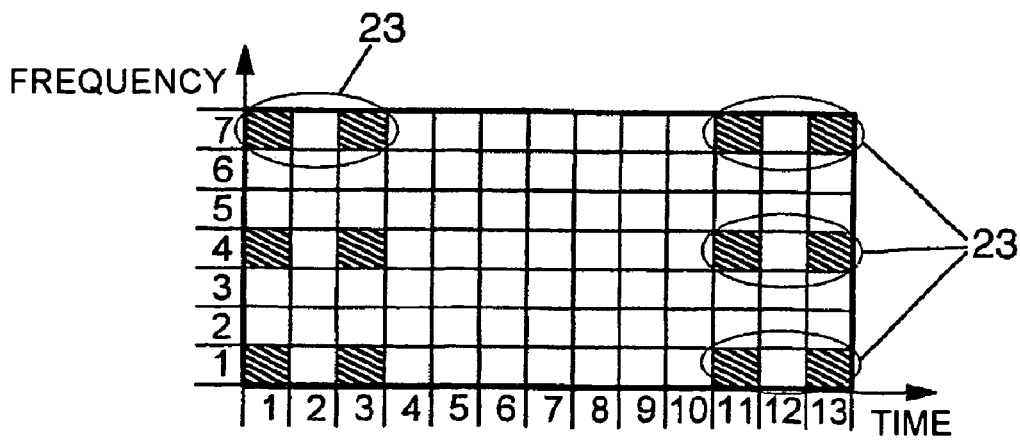

The charts of FIGS. 2a, 2b and 2c represent the structure of a frame of a multicarrier signal according to the invention, in an example where M=7 and N=13, and respectively in three distinct cases which will be explained hereinbelow. The frame is symbolized by an array, whose M×N cells correspond to the symbols of the frame.

In order to allow the tracking of the channel, the frame contains pilot symbols or blocks of pilot symbols, a pilot symbol being a symbol whose location in the frame and whose value are known to the receiver. In the figures, the pilot symbols are represented by black cells, and the other symbols are represented by white cells.

In the case of FIG. 2a, the pilot symbols such as 21 are disjoint inside the frame.

The pilot symbols such as 21 are the symbols $S_{m,n}$ with m=1+3j and n=1+4k, where j is an integer lying between 0 and 2 and where k is an integer lying between 0 and 3. These pilot symbols are therefore distributed timewise and frequencywise in such a way as to cover the frame according to a meshed structure defined by the frequency axis and the time axis. The spacing of the pilot symbols along the frequency axis corresponds to twice the spacing between the subcarriers (i.e., $2\times\gamma_0$), and their spacing along the time axis corresponds to three symbol times (i.e., $3\times\tau_0$).

In the case of FIG. 2b, certain of the pilot symbols, which are pairwise contiguous, form a block of pilot symbols such as 22. Thus, in the example shown in the figure, one can make out four blocks of pilot symbols, each block comprising several pilot symbols.

By convention, in what follows, the position of a block of pilot symbols in the frame is tagged by the position of the pilot symbols of this block which is on the carrier of smallest index, and in the symbol time transmitted first (in the figures, this is, for each block, the pilot symbol which is the lowest and the leftmost). Likewise, the size of the block is defined by a dimension along the frequency axis (hereinafter "height", denoted h) expressed as a number of symbols, and by a dimension along the time axis (hereinafter "length", denoted l), expressed as a number of symbols. The size of the block is denoted h×l, where h designates the height and l designates the length.

This convention is convenient in cases where the blocks of pilot symbols have regular dimensions (forming not examples of rows, or of patches of pilot symbols, that is to say squares or rectangles). Nevertheless, it is understood that a block of pilot symbols may have an irregular structure (for example three pilot symbols that are pairwise contiguous but not aligned).

Furthermore, it is specified that the concept of block of pilot symbols does not necessarily correspond to a concept of contiguity. In reality, the definition of a block of pilot symbols is as follows: the pilot symbols of one and the same block, which may be contiguous or disjoint, are regarded as symbols satisfying a double condition of frequency stationarity and of time stationarity of the transmission channel. The way in which these stationarity conditions are defined will be seen later.

In FIG. 2b, one can thus make out six blocks of pilot symbols 22 of dimensions 1×3, which are situated respectively on the symbols $S_{1,n}$, and $S_{12,n}$ where n=1+3j where j is an integer lying between 0 and 2.

In the case of FIG. 2c, certain pilot symbols, although being disjoint as in the case of FIG. 2a, nevertheless form blocks of pilot symbols such as 23, in the sense defined hereinabove.

Again employing the conventions stated above, the dimensions and the position of the blocks 23 of FIG. 2c are identical, respectively, to those of the blocks 22 of FIG. 2b.

Of course, one or more isolated pilot symbols as shown in FIG. 2a, one or more blocks of contiguous pilot symbols as shown in FIG. 2b, and/or one or more blocks of disjoint pilot symbols as shown in FIG. 2c, may be simultaneously present and distributed in a frame.

Figure 2D:
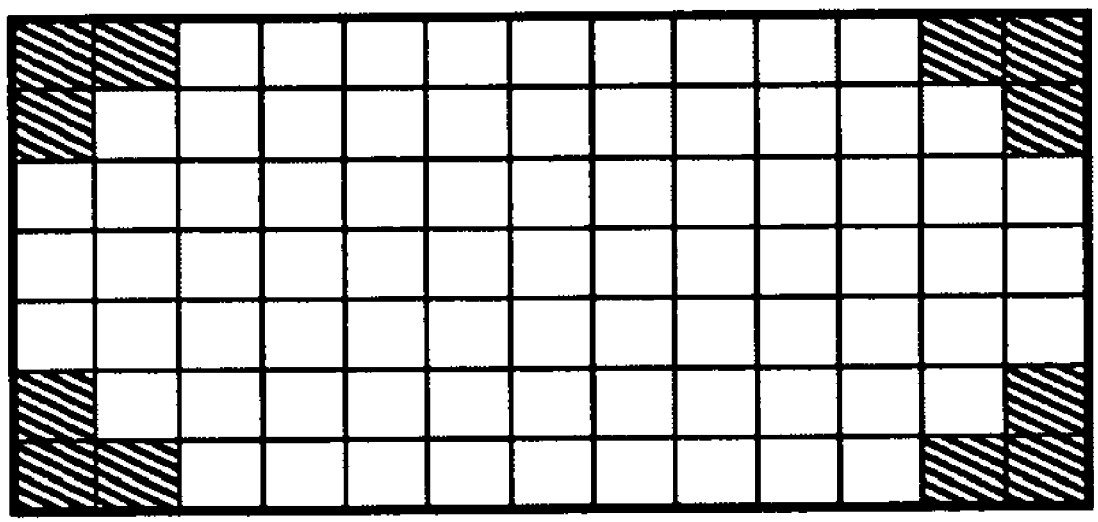

In addition, the frame may also comprise, at least one block of three pilot symbols, whose dimensions along the frequency axis and along the time axis correspond respectively to two symbols and to two symbols, as shown in the example of FIG. 2d.

The blocks of pilot symbols may be used for an improved estimation of the values of the transmission channel, which exploits the diversity of the pilot symbols contained in each block.

In the four cases envisaged in the examples of FIGS. 2a to 2d described hereinabove, the pilot symbols or blocks of pilot symbols are distributed frequencywise and timewise in such a way as to cover the frame according to a meshed structure defined by the direction of the frequency axis on the one hand, and by the direction of the time axis on the other hand.

According to a characteristic of the invention, certain at least of the M subcarriers contain no pilot symbol. Alternatively or complementarily, no pilot symbol is transmitted at certain at least of the N symbol times.

As a result of this, interpolated values covering almost all of the symbols of the frame may not be obtained by virtue of frequency interpolations alone or by virtue of temporal interpolations alone, as is the case in the state of the art. A more complex channel tracking method is required, as will now be described in conjunction with the chart of FIG. 3.

By virtue of this characteristic, it is however possible to reduce the number of pilot symbols contained in the frame, in proportions which differ depending on the frame structure and depending on the characteristics of the propagation which are taken into account when choosing the distribution of the pilot symbols.

The characteristics of the propagation through the transmission channel are defined by the maximum frequency of the variations in the fading (called the "fading frequency", in the jargon of the person skilled in the art) and the maximum delay between the multipaths. In an example, for a propagation of HT ("Highly Terrain") type which is the most constraining, it is established that the fading frequency is equal to 148.2 Hz (hertz) for a maximum speed of movement of the mobiles equal to 200 Km/h (kilometer per hour) and for a carrier frequency equal to 400 MHz (megahertz), on the one hand, and that the maximum delay between the multipaths corresponds to ±7.5 µs (microsecond), i.e. a maximum delay between the most advanced path and the most delayed path of 15 µs, on the other hand.

In order to make it possible to track the channel according to the method of the invention, by virtue alone of the estimated channel values obtained for pilot symbols present in the frame, the distribution of the symbols in the frame must comply with two conditions referred to respectively as the frequency condition and the time condition and denoted Cf and Ct respectively in what follows. These conditions are derived from the Shannon condition for the reproducibility of the sampled signals. It is expressed here by:

Cf: the maximum spacing between two pilot symbols (or blocks of pilot symbols) that are adjacent along the frequency axis is less than the inverse of the maximum delay between the multipaths through the propagation channel; moreover it is preferable to have at least three pilots or three blocks of pilots spaced regularly or otherwise along the frequency axis;

Ct: the maximum spacing between two pilot symbols (or blocks of pilot symbols) that are adjacent along the time axis must be less than the inverse of the fading frequency through the propagation channel; moreover it is preferable to have at least three pilots or three blocks of pilots placed spaced regularly or otherwise along the time axis;

Again employing the example of propagation of HT type considered above, it can be shown that the inverse of the maximum delay (1/15 µs) is equal to 66.67 kHz (kilohertz). The maximum spacing between two pilot symbols that are adjacent along the frequency axis must then be less than 66.7 kHz. In the case where the spacing $\gamma_0$ between the subcarriers is equal to 2 kHz, this signifies that there must be, at a specific symbol time, a pilot symbol transmitted at the minimum every 33 subcarriers.

The preferred supplementary condition will ideally place at least three symbols or three blocks of symbols on the frequency axis whatever be the width of the channel and hence whatever be the number of subcarriers.

Moreover, it can be shown that the inverse of the fading frequency (which is equal to twice the Doppler frequency), is equal to 6.76 ms (milliseconds). The spacing between pilot symbols along the time axis must therefore be less than 6.76 ms. In the case where a symbol time is equal to 250 μs (that is to say a throughput of 4 kilosymbols per subcarrier), this signifies that there must be, for a specific carrier, at least one pilot symbol every 27 symbols transmitted.

The preferred supplementary condition will ideally place at least three symbols or three blocks of symbols on the time axis whatever be the duration of the frame and hence whatever be the number of symbols transported in each frame on each subcarrier.

The distribution of the pilot symbols in the frame, as well as the value of these pilot symbols, which are known both to the sender and to the receiver since this is an intrinsic characteristic of the frame structure, is complied with by the sender during the construction of the signal sent.

Figure 3:
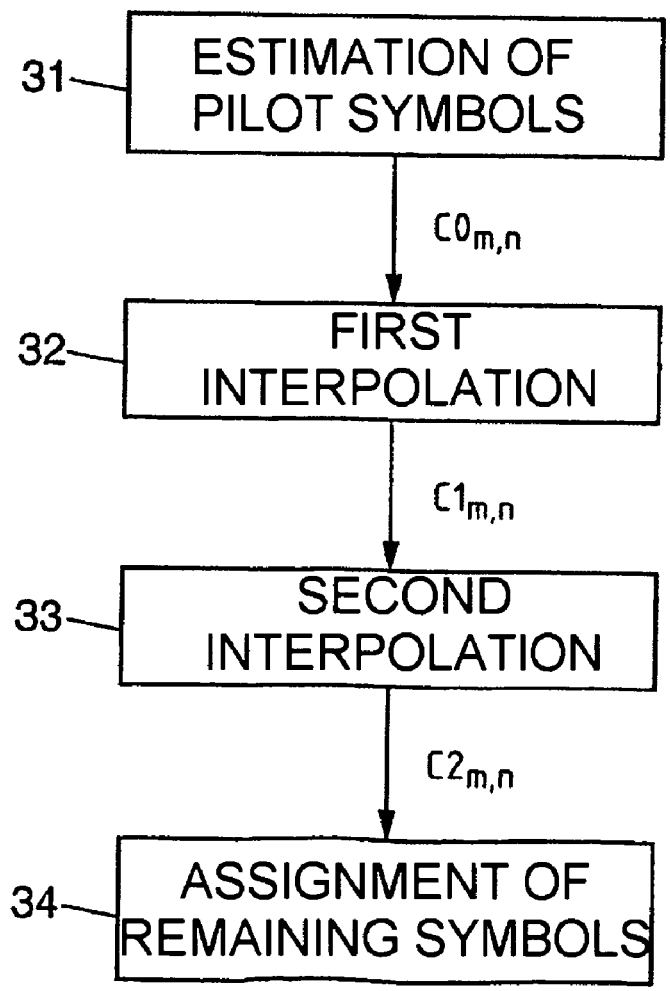
FIG. 3 is a chart illustrating steps of a method according to the invention.

The chart of FIG. 3 illustrates diagrammatically the steps of the channel tracking method according to the invention, which are implemented at the receiver level. These steps are applied to a signal frame such as transmitted through the transmission channel and such as received by the receiver. They precede the actual demodulation operations.

In a step 31, the value of the channel is estimated on the basis of the pilot symbols, in such a way as to produce estimated values of the channel $C0_{m,n}$ for at least certain of the symbols of the frame corresponding to pilot symbols. It is possible for estimated values to be thus obtained for the set of symbols of the frame corresponding to pilot symbols. Nevertheless, this is not necessarily the case, in particular when the estimation is carried out by joint estimation of the pilot symbols of a block. Specifically, in this case, it may be sufficient to assign the estimated value that results from this joint estimation, only to certain pilot symbols of the block alone, the value of the channel corresponding to the other pilot symbols being obtained by one of the following steps.

Figures 4A, 4B, 4C, 4D:
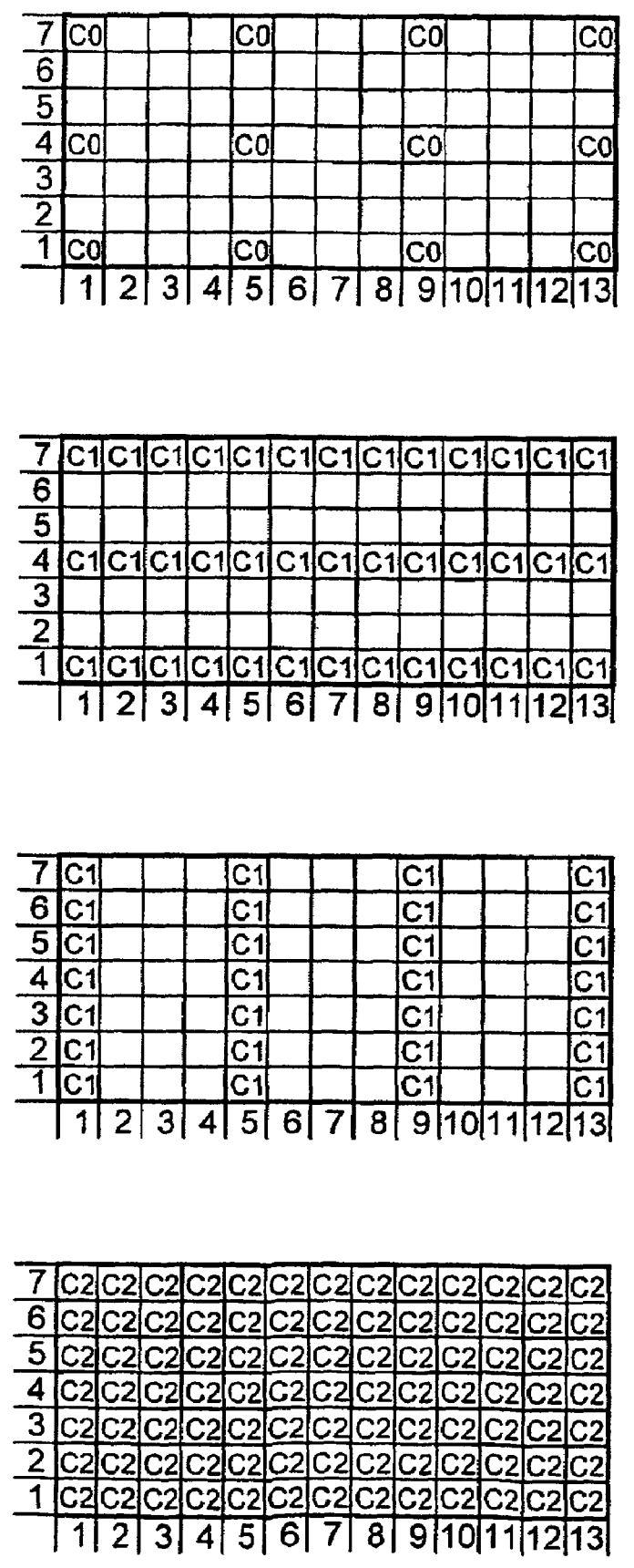

The values thus estimated are stored in an ad hoc memory structure, for example an array having M×N cells. The diagram of FIG. 4a shows the content of such a memory structure, for example an array of values, in the case of the frame shown in FIG. 2a.

In a step 32, first interpolations are then performed, on the basis of said estimated values stored in the memory structure, according to all the directions parallel to the first specific direction and passing through at least two different pilot symbols, in such a way as to produce first interpolated values of the channel $C1_{m,n}$ covering the symbols of the frame along all these directions.

When the meshed structure is defined by the direction of the frequency axis on the one hand, and by the direction of the time axis on the other hand, these first interpolations are, according to a first embodiment, interpolations along the frequency axis. They are therefore frequency interpolations. They are carried out for all the symbol times at which pilot symbols are sent. According to a second embodiment, these first interpolations are interpolations along the time axis. They are therefore temporal interpolations. They are carried out for all the subcarriers containing pilot symbols.

The values thus interpolated are stored in the aforesaid memory structure. In the case for example of the first embodiment cited above (frequency interpolations) this memory structure then contains values $C1_{m,n}$ as shown in FIG. 4b, that is to say with m lying between 1 and M and with n=1+4j, where j is an integer lying between 0 and 3. In the case for example of the second embodiment cited above (temporal interpolations) this memory structure then contains values $C1_{m,n}$ as shown in FIG. 4c, that is to say with m=1+3j, where j is an integer lying between 0 and 2, and with n lying between 1 and N.

In a step 33, second interpolations are then performed, on the basis of the first interpolated values stored in the memory structure, according to all the directions parallel to said second specific direction, in such a way as to produce the second interpolated values of the channel $C2_{m,n}$ for substantially all of the symbols of the frame.

The values thus interpolated are stored in the aforesaid memory structure. This memory structure then contains values $C2_{m,n}$ as shown in FIG. 4d, that is to say with m lying between 1 and M and with n lying between 1 and N.

When the meshed structure is defined by the direction of the frequency axis on the one hand, and by the direction of the time axis on the other hand, these second interpolations are temporal interpolations in the first aforesaid embodiment, and frequency interpolations in the second aforesaid embodiment. These interpolations are carried out for all the symbol times or for all the subcarriers, respectively in the first or in the second aforesaid embodiments.

It will be noted that the second interpolations are carried out on the basis of the values obtained by the first interpolations, that is to say on the basis of values which may be interpolated values (and not necessarily estimated values).

In a manner known per se, the first interpolations 32 and/or the second interpolations 33 each comprise, in succession a Fourier transformation operation (DFT) or inverse Fourrier transformation operation (IDFT), followed by a zero padding operation, and finally an inverse Fourier transformation operation (IDFT) or Fourrier transformation operation (DFT) respectively.

It is possible, in certain cases, that the second interpolations do not suffice to reconstruct the values of the channel corresponding to all the symbols of the frame. In particular, the values of the channel corresponding to the symbols situated at the limits of the frame may not be obtainable thus.

As the case may be, in a step 34 (FIG. 3), the interpolated value of the channel corresponding to the closest symbol of the frame which is covered by the second interpolations (i.e. for which there exists a second interpolated value of the channel) is then assigned respectively to each value of the channel corresponding to a frame symbol not covered by these second interpolations.

In the foregoing, the meshed structure corresponding to the distribution of the pilot symbols in the frame was considered to be defined by the direction of the frequency axis on the one hand and by the direction of the time axis on the other hand. However, this merely constitutes a particular case, which is convenient for the description of the invention and for the implementation of the first and second interpolations. However, this is in no way compulsory.

Specifically, in the general case, the pilot symbols may be distributed frequencywise and timewise in the frame in such a way as to cover the frame according to a meshed structure defined by a first and a second specific directions corresponding to noncolinear vectors. These directions are therefore mutually non parallel and inclined with respect to the directions of the frequency axis and of the time axis.

Again considering the case of FIG. 2a, these first and second directions may be non parallel diagonals passing through pilot symbols such as 21.

In this case, the condition Cf above is expressed in the following manner:

Cf: the projection onto the frequency axis of the maximum spacing between two pilot symbols or blocks of pilot symbols that are adjacent along both said first direction and said second direction is less than the inverse of the maximum delay between the multipaths through the propagation channel;

Likewise; the condition Ct above is expressed in the following manner:

Ct: the projection onto the time axis of the maximum spacing between two pilot symbols or blocks of pilot symbols that are adjacent along both said first direction and said second direction is less than the inverse of the fading frequency through the transmission channel.

Although a priori being less natural, the case of a meshed structure defined by a first and a second specific direction corresponding to different directions from that of the frequency axis (or of the time axis) and of the time axis (or of the frequency axis respectively), may in certain cases make it possible to further reduce the overhead of the transmission. A compromise will then have to be found with the increase in the complexity of the processing which results therefrom.

A double condition of time stationarity and of frequency stationarity of the propagation channel was mentioned earlier, with regard to the concept of pilot symbol blocks within the meaning of the present description. These two conditions may be conveyed in terms of maximum spacing of the pilot symbols, as will now be explained.

As was stated previously with regard to the example of a propagation of HT type (for a maximum mobile speed V of 200 Km/h for a carrier frequency $f_c$ of 400 MHz and for a throughput of 4 kilosymbols per subcarrier), the frame must comprise pilot symbols (or blocks of pilots) with a spacing on the time axis (or a spacing projected onto the time axis), called the temporal spacing, which must be less than the inverse of the fading frequency, that is to say it must comprise a pilot symbol every 27 symbols at the maximum.

This maximum spacing of 27 symbols on the time axis corresponds to a sampling of the propagation channel (fading) performed faster (even only slightly faster) than the occurrence of the successive fading holes (zero crossing of the fading on the time axis). Between two successive fading holes, the phase of the fading has rotated by Π (number PI). Over, for example, a tenth of this period between fading holes, that is to say over a period corresponding to 2.7 successive symbols (in what follows, for practical reasons a group having two successive symbols along the time axis will be considered), the fading will have rotated by Π/27. If the fading in the middle of this period of two symbols has a certain specific value $F_m$, the fading at the end of this period of two symbols will have a value $F_f$ which will be very close to $F_m \times e^{i \times \Pi \times 1/54}$. Hence, there is a quadratic error given by:

$$\epsilon_f^2 = \|F_m - F_f\|^2 = \|F_m\|^2 \times [2 \times \sin(\Pi/(2 \times 54))]^2 = \|F_m\|^2 \times 0.00338$$

I.e. a signal-to-noise ratio of: 24.71 dB.

Likewise if the fading at the start of this period of two symbols has a certain specific value $F_d$, then in the middle of this period there is a quadratic error given by:

$$\epsilon_d^2 = \|F_m - F_d\|^2 = \|F_m\|^2 \times [2 \times \sin(\Pi/(2 \times 54))]^2 = \|F_m\|^2 \times 0.00338$$

I.e. the same signal-to-noise ratio of 24.71 dB.

Hence, with no disadvantage, the channel may then be regarded as timewise stationary over a duration corresponding to two successive symbol times. Likewise, it was stated previously that (for a propagation of HT type, which exhibits a maximum delay between paths of 15 µs and for a spacing between subcarriers of 2 kHz) the frame must comprise pilot symbols (or blocks of pilots) with a spacing on the frequency axis (or a spacing projected onto the frequency axis), called the frequency spacing, which must be less than the inverse of the maximum delay between the multipaths, i.e. a pilot symbol every 33 subcarriers at the maximum. This spacing of 33 subcarriers on the frequency axis corresponds to a frequency sampling of the channel more frequently (even only slightly more frequently) than the occurrence of the successive frequency selectivity holes (zero crossing of the level of the signal received at certain frequencies). Between two successive frequency selectivity holes the phase of the fading has rotated by Π. Over, for example, a tenth of this space between frequency selectivity holes, that is to say 3.3 subcarriers (for practical reasons, three subcarriers will be considered), the fading will have rotated by Π×2/33. If the fading in the middle of these three subcarriers has a certain specific value $f_m$, the fading for the highest frequency subcarrier of this group of three subcarriers will have a value $f_f$ which will be very close to $f_m \times e^{i \times \Pi/33}$.

Hence, there is a quadratic error given by:

$$\epsilon_f^2 = \|F_m - F_f\|^2 = \|F_m\|^2 \times [2 \times \sin(\Pi/(2 \times 33))]^2 = \|F_m\|^2 \times 0.00906$$

I.e. a signal-to-noise ratio of 20.43 dB.

Likewise if the fading for the lowest frequency subcarrier of this group of three subcarriers has a specific value $F_d$, then in the middle of this period there is a quadratic error given by:

$$\epsilon_d^2 = \|F_m - F_d\|^2 = \|F_m\|^2 \times [2 \times \sin(\Pi/(2 \times 33))]^2 = \|F_m\|^2 \times 0.00906$$

I.e. the same signal-to-noise ratio of 20.43 dB.

Hence, without any disadvantage, the channel may be regarded as frequencywise stationary over three successive subcarriers.

As a consequence of the foregoing, pilot symbols which are not spaced more than two symbols apart along the time axis or more than three symbols apart along the frequency axis may be regarded as satisfying a double condition of time and frequency stationarity.

It will be noted that the considerations regarding the stationarity of the fading are to be assessed as a function of the problem to be treated, that is to say in particular of the characteristics of the envisaged propagation, of the speed of the mobile, of the carrier frequency.

In examples, the frame comprises blocks of pilot symbols (defined in the sense that a pilot symbols block is a group of adjacent or non adjacent pilot symbols for which the condition of time stationarity and of frequency stationarity of the transmission channel is satisfied).

In particular, provision may be made for the frame to comprise at least one block of six pilot symbols, whose dimensions along the frequency axis and along the time axis correspond respectively to three symbols and to two symbols.

As a variant or as an adjunct, provision may also be made for the frame to comprise at least one block of three pilot symbols, whose dimensions along the frequency axis and along the time axis correspond respectively to one symbol and to three symbols.

As a variant or an as adjunct, provision may also be made for the frame to comprise at least one block of three pilot symbols, whose dimensions along the frequency axis and along the time axis correspond respectively to two symbols and to two symbols.

Figure 5:
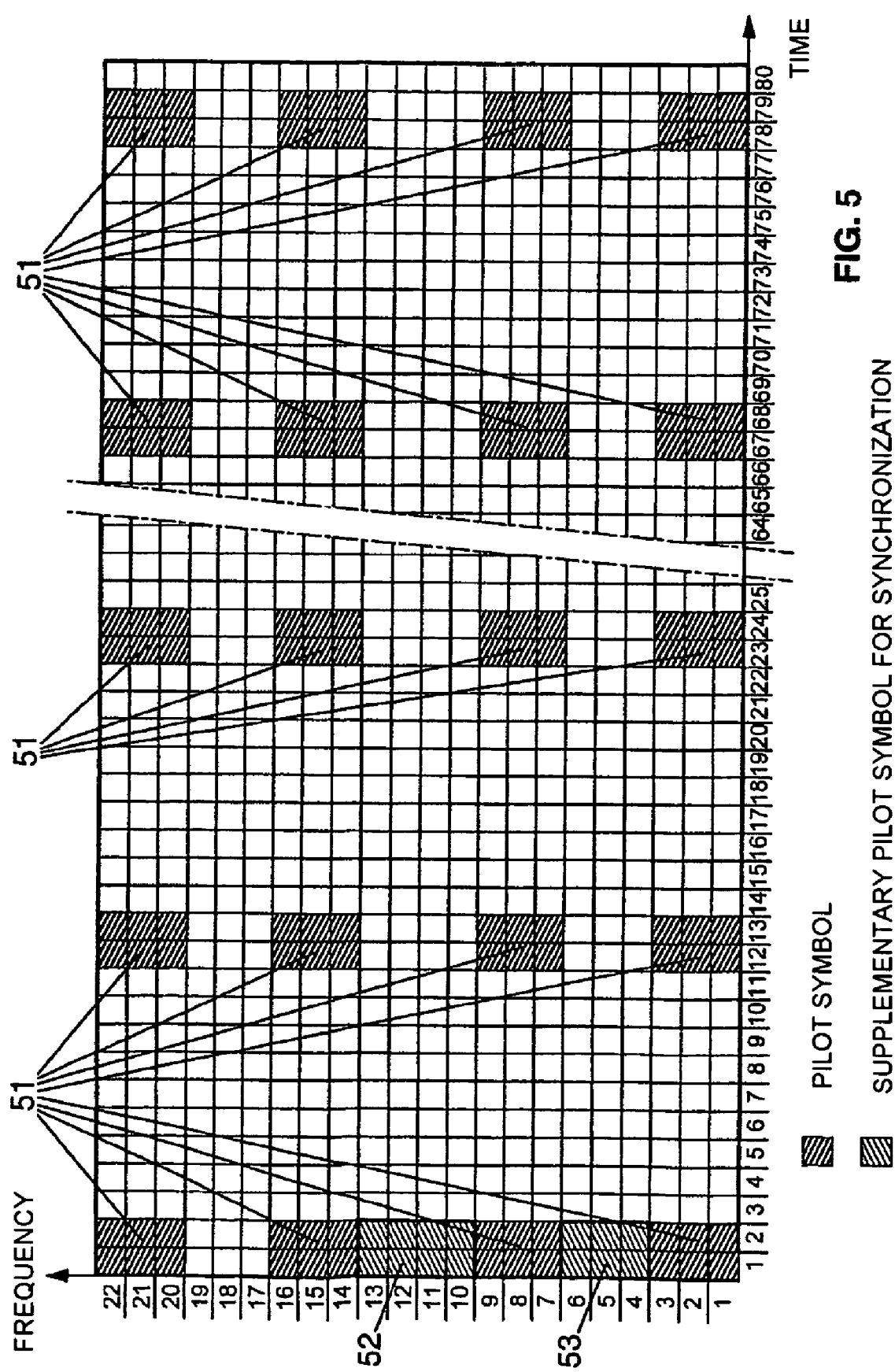
FIG. 5 is a chart illustrating the structure of a frame of a multicarrier signal according to an exemplary embodiment of the invention.
Figure 6:
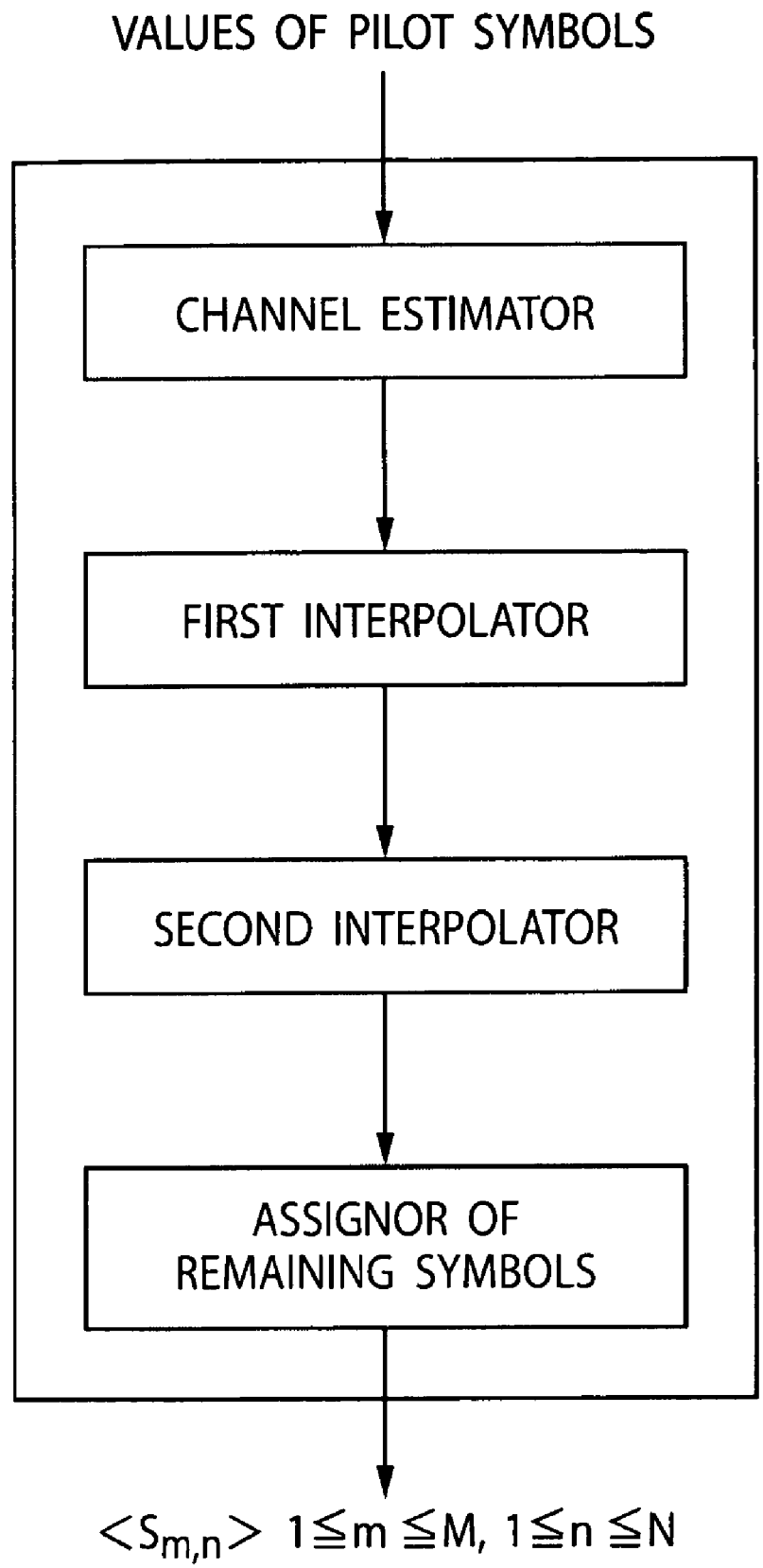
FIG. 6 is a flow diagram of one embodiment of the present invention.

The chart of FIG. 5 represents the structure of a frame of a multicarrier signal according to an exemplary embodiment of the invention.

In this example, the signal occupies a frequency band B)=44 kHz (kilohertz) within a channel 50 kHz wide. Moreover, the spacing between the subcarriers is $\gamma_0=2$ kHz. The frame therefore comprises M=22 subcarriers.

Furthermore the duration of the frame is D=20 ms (milliseconds). The throughput on each subcarrier is 4 kilosymbols/s hence the temporal spacing between the symbols is $\tau_0=250$ μs. Stated otherwise, the frame comprises N=80 symbol times.

The frame therefore comprises M×N=1760 symbols. Among the latter, there are 206 symbols which are pilot symbols. Stated otherwise, P=206.

According to this example, the frame comprises 32 blocks such as 51, of six (6) pilot symbols each, whose dimensions along the frequency axis and along the time axis correspond respectively to three (3) symbols and to two (2) symbols. Their respective locations in the frame, which are tagged by the location of the pilot symbol of the block considered which is in the subcarrier of lowest frequency and in the symbol time transmitted first (i.e., the bottommost and leftmost symbol), are the locations of the symbols $S_{m,n}$ (it is recalled that m and n are integer indices which tag the position of the symbol along the frequency axis and along the time axis respectively), with m lying in the set {1,7,14,20} and with n=1+11×j, where j is an integer lying in the set [0;7].

These 32 blocks are used for tracking the channel according to the method which has been described earlier.

Furthermore, the frame comprises a first supplementary block 52 of six pilot symbols whose dimensions along the frequency axis and along the time axis correspond respectively to three symbols and to two symbols.

It also comprises a second supplementary block 53 of eight pilot symbols whose dimensions along the frequency axis and along the time axis correspond respectively to four symbols and to two symbols.

The respective locations of the supplementary block 52 and of the supplementary block 53 in the frame, which are tagged by the location of the pilot symbol of the block considered which is in the subcarrier of lowest frequency and in the symbol time transmitted first (i.e., the bottommost and leftmost symbol), are the locations of the symbols $S_{m,n}$ with the pair (m,n) lying in the set of pairs {(4,1),(10,1)}. Stated otherwise, the blocks 52 and 53 are positioned on the symbols $S_{4,1}$ and $S_{10,1}$ respectively.

The supplementary blocks of pilot symbols 52 and 53, in combination with the blocks 51 which are adjacent to them, are used by the receiver for frame synchronization.

The invention claimed is:

1. A method of tracking a transmission channel on the basis of a multicarrier, comprising the following steps:
   a) estimating the channel on the basis of the pilot symbols, to produce estimated channel values that are estimated for at least certain of the symbols of a frame which correspond to the pilot symbols;
   b) performing first interpolations, on the basis of said estimated channel values, according to all directions parallel to a first specific direction and passing through at least two different pilot symbols for which there exists an estimated channel value to produce first interpolated values of the channel for the symbols of the frame in all these directions;
   c) performing second interpolations, on the basis of said first interpolated values, in all directions parallel to a second specific direction and passing through at least two symbols for which there exists a first interpolated value, to produce second interpolated values of the channel for substantially the entirety of the symbols of the frame;
   d) assigning, to each frame symbol for which there exists no second interpolated value of the channel, respectively, the interpolated value of the channel for the frame symbol which is the closest thereto and for which there exists a second interpolated value of the channel, wherein the step of estimating the channel is carried out by joint estimation on the basis of the pilot symbols in blocks of pilot symbols, a block of pilot symbols being a group of non-contiguous pilot symbols with a maximum temporal spacing less than a tenth of the inverse of the fading frequency through the transmission channel and with a maximum frequency spacing less than a tenth of the inverse of the maximum delay between the multipaths through the propagation channel.

2. The method of claim 1, wherein, the first specific direction being the direction of the frequency axis and the second specific direction being the direction of the time axis, the first interpolations are preparing interpolations, and the second interpolations are temporal interpolations.

3. The method of claim 1, wherein the first interpolations and/or the second interpolations comprise in succession a Fourier transform operation or inverse Fourier transform operation, a zero padding operation, and an inverse Fourier transform operation, or Fourier transform operation respectively.

4. The method of claim 1, wherein the first specific direction is the direction of a frequency axis and the second specific direction is the direction of a time axis.

5. The method of claim 1, wherein the frame comprises at least three pilot symbols or blocks of pilot symbols spaced along a frequency axis and/or at least three pilot symbols or three blocks of pilot symbols spaced along a time axis.

6. The method of claim 1, wherein the frame comprises at least one block of six pilot symbols, whose dimensions along a frequency axis and along a time axis correspond, respectively, to three symbols and to two symbols.

7. The method of claim 1, wherein the frame comprises at least one block of three pilot symbols, whose dimensions along a frequency axis and along a time axis correspond, respectively, to one symbol and to three symbols.

8. The method of claim 1, wherein the frame comprises at least one block of three pilot symbols, whose dimensions along a frequency axis and along a time axis correspond, respectively, to two symbols and to two symbols.

9. The method of claim 1, wherein the frame comprises 32 blocks of six pilot symbols each, wherein each block has dimensions along the frequency axis and along the time axis corresponding, respectively, to three symbols and to two symbols, and wherein respective locations of the blocks in the frame, these locations being tagged by the location of the pilot symbol of the block which is in the subcarrier having the lowest frequency and in the symbol time transmitted first, are the locations of symbols $S_{m,n}$, where m and n are integer indices which tag the position of the symbol along the frequency axis and along the time axis, respectively, with m lying in the set {1,7,14,20} and with n=11 xj, where j is an integer lying in the set [0;7].

10. The method of claim 9, wherein the frame further comprises a first supplementary block of six pilot symbols whose dimensions along the frequency axis and along the time axis correspond, respective, to three symbols and to two symbols, as well as a second supplementary block of eight pilot symbols whose dimensions along the frequency axis and along the time axis correspond, respectively, to four symbols and to two symbols, wherein the respective locations of these first and second supplementary blocks in the frame, tagged by the location of the pilot symbol of the block considered which is in the subcarrier having the lowest frequency and in the symbol time transmitted first, are the locations of symbols $S_{m,n}$ with the pair (m,n) lying in the set of pairs {(4, 1), (10,1)}.

11. A device for tracking a transmission channel on the basis of a multicarrier signal wherein the multicarrier signal is constructed on a time-frequency lattice defined by a frequency axis and a time axis, the multicarrier signal comprising frames having M×N symbols distributed over a given number M of subcarriers each frame being divided into a given number N of specific symbol times, said M×N symbols of each frame comprising a given number P of pilot symbols distributed time-wise and frequency-wise as to cover the frame according to a meshed structure defined by a first and a second specific direction corresponding to noncolinear vectors, where the numbers M, N and P are nonzero integers, so that:

a projection onto the frequency axis of the maximum spacing between two pilot symbols or blocks of pilot symbols adjacent in both said first specific direction and said second specific direction, called the frequency spacing, is less than half the inverse of the maximum delay between the multipaths through the propagation channel; and that, a projection onto the time axis of the maximum spacing between two pilot symbols or blocks of pilot symbols adjacent in both said first specific direction and said second specific direction, called the temporal spacing, is less than half the inverse of the fading frequency through the transmission channel, and so that, furthermore, some of the M subcarriers contain no pilot symbol and/ or that no pilot symbol is transmitted at some of the N symbol times, wherein the frame comprises blocks of pilot symbols, a block of pilot symbols being either a group of pilot symbols in which each pilot symbol is contiguous time-wise and frequency-wise, to at least one other pilot symbol of the group, or a group of pilot symbols with a maximum temporal spacing less than a tenth of the inverse of the fading frequency through the transmission channel and with a maximum frequency spacing less than a tenth of the inverse of the maximum delay between the multipaths through the propagation channel, comprising:

an estimation unit for estimating the channel on the basis of the pilot symbols, to produce estimated channel values for at least some of the symbols of the frame which correspond to pilot symbols;

a first interpolator unit, for forming first interpolations, on the basis of said estimated channel values, according to all directions parallel to a first specific direction and passing through at least two different pilot symbols for which there exists an estimated value of the channel, to produce first interpolated values of the channel for the symbols of the frame in all these directions;

a second interpolator unit, for performing second interpolations, on the basis of said first interpolated values, in all directions parallel to a second specific direction and passing through at least two symbols for which there exists a first interpolated value, to produce second interpolated values of the channel for substantially the entirety of the symbols of the frame; and, an assignment unit, for assigning to each frame symbol for which there exists no second interpolated value of the channel, the interpolated value of the channel for the frame symbol which is closest thereto and for which there exists a second interpolated value of the channel.

* * * * *